3,819,838
ENCAPSULATED FLAVORING COMPOSITION

Ross Alexander Smith and Andreas Lambrou, London, England, assignors to Bush Boake Allen Limited, London, England
No Drawing. Filed Aug. 4, 1970, Ser. No. 60,939
Int. Cl. A23l 1/22, 1/26; B01j 13/02
U.S. Cl. 426—89                                    5 Claims

ABSTRACT OF THE DISCLOSURE

A solid particulate composition containing multiple capsules each consisting of at least one primary capsule wherein the active ingredient is encapsulated in a water-soluble encapsulating material and the primary capsule is being re-encapsulated in a water-insoluble encapsulating material. The active ingredient encapsulated in the primary capsule is a flavoring composition containing volatile components which are released during cooking and baking to flavor the product with which the said encapsulated material is admixed before or during the cooking and baking process. The flavoring composition consists essentially of a flavoring essence selected from the group consisting of essential oils, oleoresins and mixtures thereof.

---

The present invention relates to encapsulated compositions and is particularly applicable to microencapsulated food additives, especially encapsulated flavours for use in, for example, bakery.

It is well known to encapsulate liquid or viscous compositions in a suitable solid encapsulating material to provide a stable particulate solid. For example, essential oils, oleoresins and flavouring essences are sometimes micro-encapsulated in a suitable water soluble gum, such as gum acacia, to form a dry powdery composition. Such encapsulation may conveniently be achieved by spray drying an emulsion of the active material in an aqueous solution of the encapsulating material.

We have now realized that the water solubility of the prior art material, in certain applications, is a disadvantage, in that when mixed with other food ingredients, including water or moist ingredients, the capsule shells dissolve and release their contents. Where the composite food is then heated, either during the manufacturing process or eventually by the consumer, or both, deterioration and loss of flavour occur. For example, it has long been known that when flavouring compositions are heated for prolonged periods, e.g. in bakery, the more volatile components are driven off and the full balance and roundness of the flavouring lost. We have discovered that it is possible to improve the flavour retention in such instances by rendering the capsules water insoluble below predetermined elevated temperatures. The invention is generally applicable to circumstances in which premature dissolution of encapsulated material in water is a problem.

Our invention, therefore, provides a granular or powdery solid composition comprising multiple capsules, each consisting of at least one primary capsule, wherein an active ingredient is encapsulated by a water soluble solid encapsulating material, which primary capsule is re-encapsulated in a water insoluble solid encapsulating material.

The multiple capsule may consist of a single primary capsule coated with a layer of water insoluble solid, or may comprise a clump of primary capsules, embedded in and surrounded by the water insoluble solid.

The primary capsules are preferably micro-capsules of the type formed by dehydrating an emulsion containing the active ingredient and the encapsulating material, e.g. by spray drying. Typically, the primary capsules have a diameter of, for example, from 1 to 300μ.

The active material may, for example, comprise an essential oil, oleoresin or other flavoring essence, or mixtures thereof, with or without other substances. It may comprise a colouring material.

The water soluble encapsulating material may, for example, be a natural or chemically modified gum, e.g. gum acacia, a natural or modified starch, an alginate or a proteinaceous material, such as gelatin or casein, whether natural or modified.

Various water insoluble encapsulating materials may be used, the nature and melting point of each being related to the processes and end products in which the resulting capsules are incorporated.

The water insoluble encapsulating material may, for instance, have a melting point above 50° C. It may, for example, be a hydrogenated vegetable oil, a fatty acid, e.g. stearic acid, or a high melting fat or fatty ester. Preferably the melting point of the water insoluble encapsulating material is substantially below that of the water soluble encapsulating material.

The primary capsules may be formed in conventional ways, for example by spray drying an emulsion of the active ingredient in an aqueous solution of the water insoluble encapsulating material. The primary capsules may conveniently be re-encapsulated by dispersing them in a molten fat or other water insoluble encapsulating material and spray cooling the dispersion. Alternatively, for example where the melting points of the two encapsulating materials are not sufficiently different, the primary capsules may be dispersed in a solution of the water insoluble encapsulating material in a suitable solvent, e.g. a volatile, non-aqueous organic solvent such as petroleum ether or benzene, and the solvent evaporated using, for example, a spray drying apparatus.

By suitable choice of encapsulating materials it is possible according to our invention to ensure release of an active ingredient at a predetermined stage of a heating process.

The relative proportions of active ingredient and encapsulating materials may be varied widely. In general it is preferred to use the highest possible proportion of active ingredient consistent with achieving satisfactory encapsulation and dependent on the nature of the active material. In some instances, however, it is desired to dilute the active ingredient. Dilution may conveniently be achieved by increasing the proportion of either or both encapsulating materials or by admixing the active ingredient with an additional diluent. Typically the proportion of active ingredient in the primary capsule may be from about 20% by weight up to 98% or higher in some instances, depending upon the nature of the active ingredient, the strength required, the ease of encapsulation from the emulsion system chosen, and the desired stability. The proportion of primary capsules in the total composition may, for example, be from 10 to 98% by weight.

Where a composition according to the invention is intended for use in food the ingredients must, of course, be substantially non-toxic.

The invention is particularly apt for the flavouring of bakery mixes suitable for use in the preparation of bread, biscuits, cakes or other baked confections including buns, shortbread, crackers, wafers, sponges and puddings.

For example a composition of our invention may be added to mixes containing such conventional bakery ingredients as flour or oatmeal, water or milk, fats such as butter or margarine, eggs, yeast or baking powder, flavourings such as salt, sugar or cocoa, fruit or nuts.

The invention is illustrated by the following Examples:

Example 1

Primary capsules are formed by spray drying an emulsion of 10 parts by weight of Oleoresin Cinnamon and 20 parts by weight of Cinnamon oil in a 25% w./w. aqueous dispersion containing 70 parts by weight of gum acacia.

20 parts by weight of the spray dried capsules are dispersed in 80 parts by weight of a molten hardened vegetable fat (m.p. 55–88° C.), and the resulting dispersion is spray cooled.

Example 2

Primary capsules were formed by spray-drying an emulsion of 65 parts by weight of Lemon Oil, and 35 parts by weight of a modified gelatin dissolved in 190 parts by weight of water.

20 parts by weight of the spray dried capsules were dispersed in 80 parts by weight of a molten non self-emulsifying glyceryl monostearate (m.p. 60° C.), and the resulting dispersion is spray cooled.

We claim:

1. A particulate composition wherein the particles comprise multiple capsules each consisting of at least one primary capsule containing a flavoring composition for use as a flavoring agent for food or baking products, said flavoring composition containing volatile components, which are released during cooking and baking to flavor the product, said flavoring composition consisting essentially of a flavoring essence selected from the group consisting of essential oils, oleoresins and mixtures thereof, encapsulated in a water-soluble encapsulating material selected from the group consisting of natural and modified gums, natural and modified starch, alginates, and proteins, said flavoring composition constituting from 20% to 98% by weight of said primary capsules, and said primary capsules being re-encapsulated in a water-insoluble encapsulating material selected from the group consisting of hydrogenated vegetable oil, fatty acids, fatty esters and glycerides all having a melting point greater than 50° C., but less than that of the said water-soluble encapsulating material, to form said multiple capsules.

2. A composition according to Claim 1 wherein the primary capsules constitute from 10 to 98% by weight of the multiple capsules, and wherein said volatile components are essential oils.

3. A composition according to Claim 1 wherein the water-soluble encapsulating material is selected from the group consisting of natural and modified gums.

4. A composition according to Claim 3 wherein the water-soluble encapsulating material is gum acacia.

5. A composition according to Claim 1 wherein the water-soluble encapsulating material is selected from the group consisting of natural and modified starch, alginates and proteins.

References Cited

UNITED STATES PATENTS

| | | | |
|---|---|---|---|
| 2,828,206 | 3/1958 | Rosenberg | 424—34 |
| 3,080,318 | 3/1963 | Claus | 117—100 A X |
| 3,043,782 | 7/1962 | Jensen | 252—316 |
| 2,800,457 | 7/1957 | Green et al. | 252—316 |
| 3,159,585 | 12/1964 | Evans et al. | 252—316 |

RICHARD L. LOVERING, Primary Examiner

U.S. Cl. X.R.

117—100 A; 252—316; 264—4; 426—223